United States Patent [19]
Hanson, Jr.

[11] Patent Number: 5,488,699
[45] Date of Patent: Jan. 30, 1996

[54] METHOD FOR GENERATING A COMPUTERIZED THREE DIMENSIONAL MODEL OF A SHOE HEEL AND A TWO DIMENSIONAL COVER FOR THE SAME

[75] Inventor: Joseph R. Hanson, Jr., Town and Country, Mo.

[73] Assignee: Brown Group, Inc., St. Louis, Mo.

[21] Appl. No.: 65,752

[22] Filed: May 24, 1993

[51] Int. Cl.⁶ ................................................ G06T 17/00
[52] U.S. Cl. ....................... 395/119; 364/469; 364/470
[58] Field of Search .................................. 395/119, 125; 364/469, 470, 474.24; 12/16.6, 47, 48, 142 G

[56] References Cited

U.S. PATENT DOCUMENTS

| | | | |
|---|---|---|---|
| 4,546,434 | 10/1985 | Gioello | 364/470 X |
| 4,829,456 | 5/1989 | Joonishi et al. | 395/119 |
| 4,926,344 | 5/1990 | Collins et al. | 364/470 X |
| 5,038,291 | 8/1991 | Wang et al. | 364/474.24 X |
| 5,107,444 | 4/1992 | Wu | 395/119 |
| 5,163,006 | 11/1992 | Deziel | 364/470 |
| 5,163,007 | 11/1992 | Slilaty | 364/470 |

*Primary Examiner*—Mark K. Zimmerman
*Attorney, Agent, or Firm*—Polster, Lieder, Woodruff & Lucchesi

[57] ABSTRACT

A method for generating a computerized three dimensional model of a shoe heel and converting that computerized shoe heel model into two dimensional flat patterns for cutting material that is useful to cover the breast and back surfaces of the heel. The method also lends itself to applying a table of values for entry into a computer to enable the creation of a family of heel sizes with minimum changes in the table of values.

4 Claims, 5 Drawing Sheets

5,488,699

METHOD FOR GENERATING A COMPUTERIZED THREE DIMENSIONAL MODEL OF A SHOE HEEL AND A TWO DIMENSIONAL COVER FOR THE SAME

BACKGROUND OF THE INVENTION

This invention relates to a method of generating a computerized three dimension model of a shoe heel from a two dimension profile pattern, and thereafter following a method of deriving a two dimension pattern for the surfaces of a three dimension shoe heel model.

There has been a continuing problem with an acceptable procedure for applying covering material to the heels of footwear so that the heel surfaces to be covered present a smooth surface in the breast and back, and the patterns of material can be produced to obtain precise covering fits for the heel surfaces without unnecessary expense or waste of material for the surfaces to be covered.

A continuing problem is related to providing heel shapes for a given run of sizes of a particular shoe design so that progressive changes in shoe sizes can be accomodated with changes in the heel configuration and patterns for the covering materials.

It is recognized that in forming shoe heels in hand operations there is always the problem of inaccuracies in shaping the surfaces, and particularly is this evident in building a size run of heels for a particular design or configuration in the upper to be attached to the outsole and heel components. The shape and fit of heels for a run of sizes of the uppers is critical, and a reduction in the amount of hand work applied to the production of shoes, heels, and heel covers is a goal that has been hard to completely eliminate.

To overcome as much of the problem as is possible, the invention is directed to a method for building a shoe heel by starting with a selected toplift pattern, which is the heel top, and designating the geometric center of the pattern to rest on a three dimension (3D) center point, and then proceed with a method to digitize the heel profile pattern from that point.

In carrying out the method of the invention a table of values is needed to be entered in the heel building program so that the overall dimensions and shape configuration is understood to set the important perameters from which to work. In the following presentation of the invention two dimensional views will be indicated as 2D, and three dimensional views will be indicated as 3D.

Other objects and features of the invention will appear from the following specification relating to the drawings in which.

DETAIL DESCRIPTION OF THE HEEL BUILDING SYSTEM

Figures 1, 2, 3:
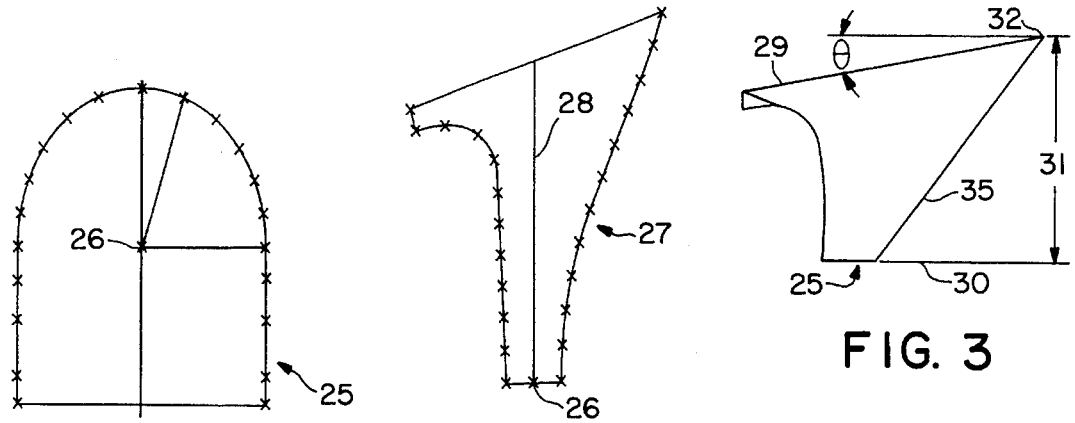
FIG. 1 is a top plan view of the toplift shoe pattern in 2D having an indicated center point.
FIG. 2 is a profile pattern of the side elevation in 2D of a heel, the opposite side being a like profile.
FIG. 3 is a 2D diagram similar to the side view of FIG. 2 in which a table of values is indicated for the shoe heel pattern.

The generation of a computerized three dimensional (hereafter 3D) model of a shoe heel is initiated by determining a two dimension (hereafter 2D) pattern of the heel toplift shown at 25 in FIG. 1. That toplift pattern is arranged such that the geometric center 26 of the pattern rests on what will be the 3D center point where the coordinates X, Y and Z are zero. Having done this the method progresses by digitizing a heel side 2D profile 27 where the center line 28 runs through the center 26 of the toplift area, as in FIG. 2 which is the right side view of a heel.

The method builds the heel based on a table of values which must be entered in the computer. Those values and the relationship of the measurements from an actual shoe heel are as follows:

| 1. Size | Corresponding to shoe size |
|---|---|
| 2. Angle | Heel wedge angle |
| 3. Back Height | Back of heel to floor |
| 4. Seat length | Seat pattern length back to front |
| 5. Top Length | Top pattern length back to front |
| 6. Top Width | Top pattern width |
| 7. Shrinkage | Scaling factor for plastic |
| 8. Pinch factor | Scaling factor for construction of the pinch |
| 9. Pinch point | Percentage of back curve |

Figures 4, 5, 6:
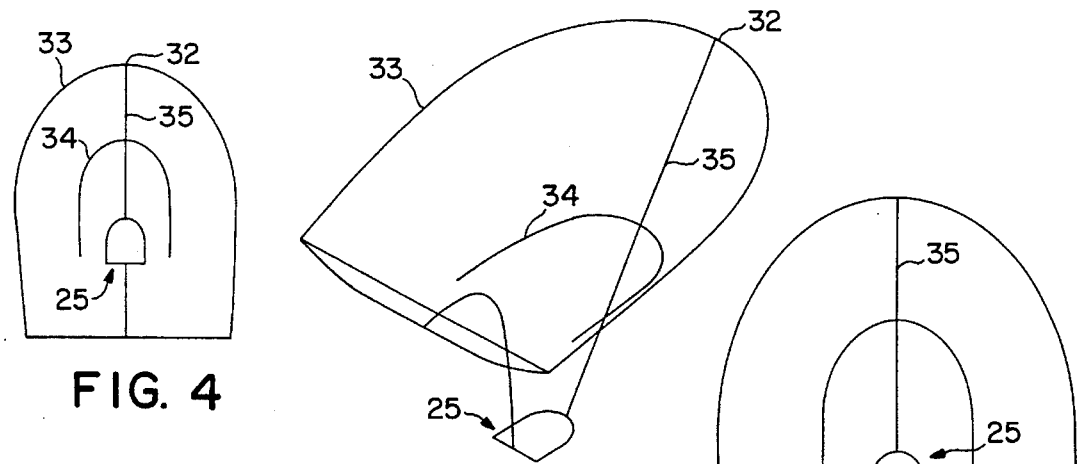
FIG. 4 is a plan view of a heel seat relating the pinch factor and the toplift to the length of the heel back curve.
FIG. 5 is a 3D isometric view showing the relationship of the construction shapes of a heel.
FIG. 6 is a 3D view of the heel seat pattern and the related characteristics of the breast configuration.

The wedge angle $\Theta$ indicated in FIG. 3 is the angle of heel seat surface 29 with respect to the horizon or floor indicated at 30. The heel back height is the distance 31 from the floor 30 to the center point 32 of the back of the seat curve 33, as indicated in FIG. 4. Having done this, a construction curve 34 is generated, as seen in FIG. 5, such that the curve 34 is a duplicate of the heel toplift pattern curve 25 multiplied by a scaling factor or the inverse of the pinch factor and placed at a point along the back curve 35 at the pinch point position which is a fraction of the length of the back curve 35 as in FIG. 5.

Figure 7:
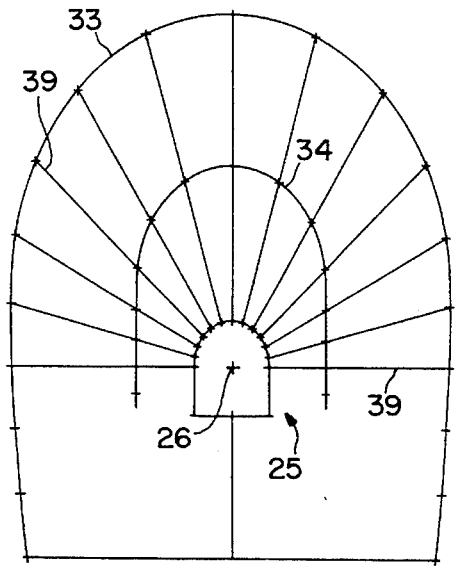
FIG. 7 is a top view in 3D similar to FIG. 6 to show incremental points on the heel construction curve at 15 degrees angular lines radiating from the center point.
Figure 8:
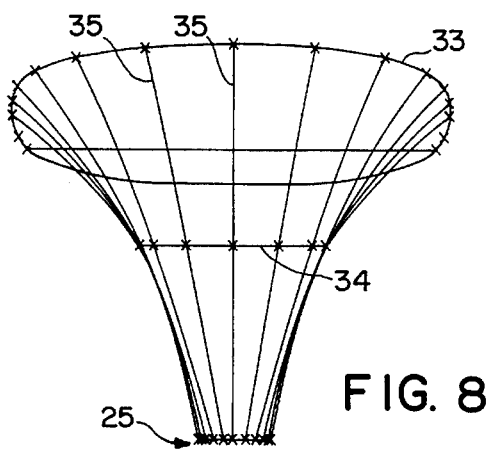
FIG. 8 is a back 3D view of the construction vertical curves around the back of the heel.
Figure 9:
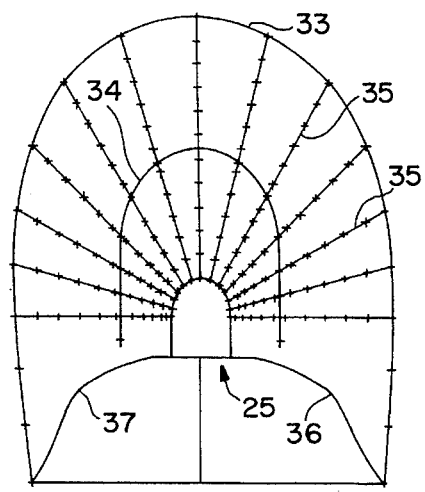
FIG. 9 is a top 3D view, similar to FIG. 7, showing points and a heel breast curve.
Figure 10A:
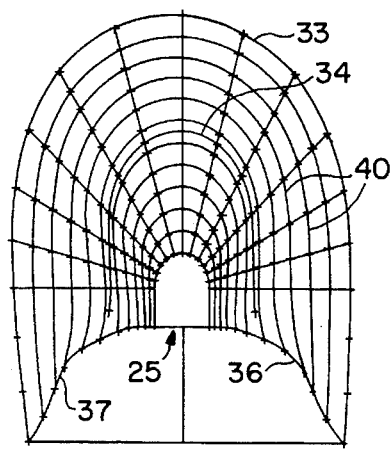
FIG. 10A is a 3D view similar to FIG. 9 with horizontal curves inserted by using the points established in FIG. 9.
Figure 10B:
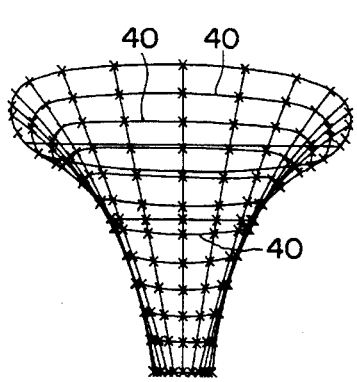
FIG. 10B is a back 3D view showing the construction of further curves not necessarily horizontal.

Having generated the heel seat curve 33 and the pinch factor curve 34, the side profile pattern of FIG. 3 is input in the computer and the respective curves are joined to the toplift pattern 25, and the seat pattern curve 33 is connected to the profile pattern at the proper back height 31. A further characteristic of the heel construction in 3D is seen in FIG. 6 to generate the edge margins 36 and 37 of the heel breast 38. From the isometric 3D view of FIG. 5 a pattern of connected curves 25, 33 and 34 is seen in FIG. 7, a series of lines 39 is input in the top view (see FIG. 7), using the zero point 26 in the toplift pattern. These lines 39 are at incremental 15° angles from the horizontal one of lines 39. The lines 39 intersect on the toplift 25, the pinch curve 34 and the seat curve 33 at defined points. These points are used to construct vertical curves 35 around the back of the heel, as in FIG. 8. Next a series of points is placed along each of the vertical curves 35 as shown in FIG. 9. These points are used to construct horizontal curves 40 around the back of the heel as in FIG. 10A and 10B to construct the back surface of the heel.

Figure 11A:
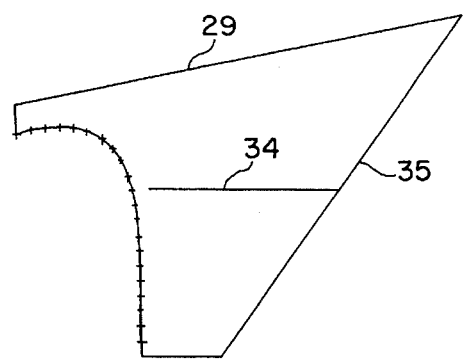
FIG. 11A is a fragmentary side view in 2D of a profile heel breast curve on which a series of points are placed along the breast profile curve.
Figure 11B:
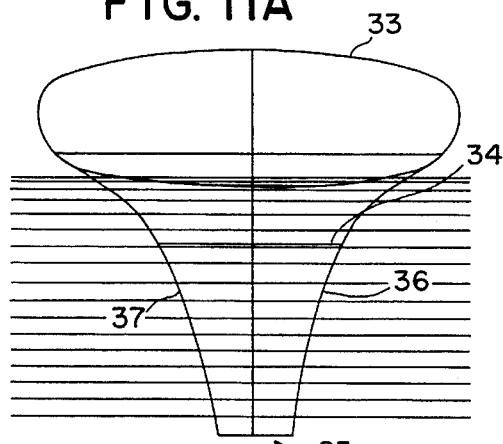
FIG. 11B is a fragmentary 3D front elevation view having a series of horizontal lines passing through each point along the center line of FIG. 7 and right and left hand curves inserted through points generated at the ends of the top, auxiliary and seat curves.
Figure 13:
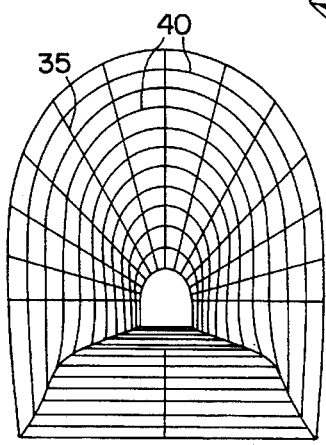
FIG. 13 is a top view of finished breast and back curvatures.
Figure 12B:
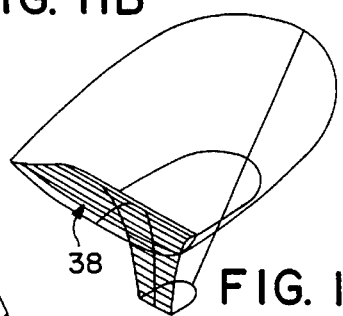
FIG. 12B is an isometric 3D view of breast curvature.
Figure 12A:
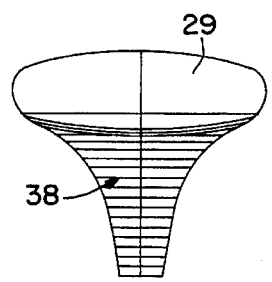
FIG. 12A is a front elevation view of 3D breast curvature.

The computer is now conditioned to construct the front edge curves of the heel breast 38 using the points generated in the profile view of FIG. 11A. A series of horizontal lines are generated at each point, as in FIG. 11B in the front view. Temporary right-hand and left-hand curves 36 and 37 are generated at the toplift, pinch curve, and seat curve 25, 34 and 33 respectively. The points of intersection of the horizontal lines with the right-hand and left-hand curves are used to construct the 3D curves of the heel breast 38, as in FIGS. 12A and 12B. Thus the heel building method is created to generate 3D vertical and horizontal curves (FIG. 13) which present the desired heel which may be used to generate tool paths in order to form the heel in 3D.

However, the 3D heel constructed as described above may be covered by fabric or other suitable material. In order to generate patterns for such coverings, the 3D shape needs to be reduced to a 2D pattern which can be accomplished as follows.

Figure 14A:
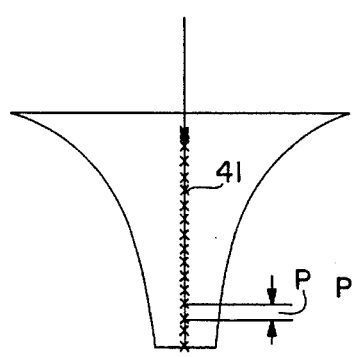
FIG. 14A is a 3D front view of the heel with points on the center line inserted.
Figure 14B:
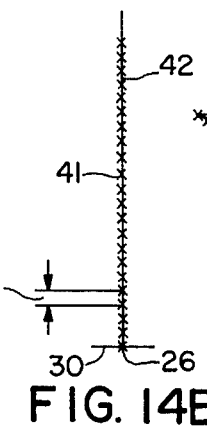
FIG. 14B is a 2D front view of the points on the vertical center line of FIG. 14A.
Figure 15:
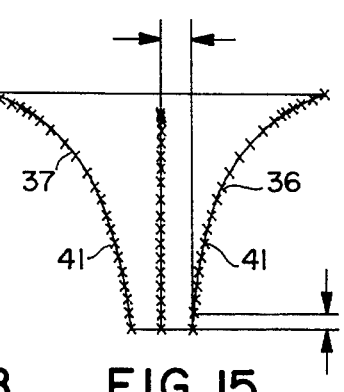
FIG. 15 illustrates a 3D view of the relationship of the points to be used in the 2D breast curve flattening process.
Figure 16:
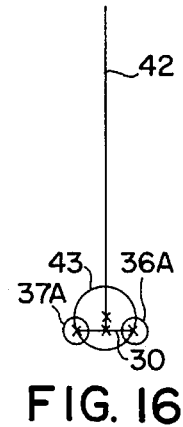
FIGS. 16–18 are the 2D building of the side margins of the vertical curves.

To reduce the 3D shape of the heel breast 38 to a flattened 2D shape for yielding a pattern it is necessary to generate a number of points 41 along the 3D center curve of the heel at an even distribution or spacing as is seen in FIG. 14A, and that line of points is then erect in FIG. 14B on vertical line 42 with the evenly distributed points P as in FIG. 14A with the bottom of that line at the zero point 26. A horizontal bottom line the same as the 3D horizontal bottom line 30 (FIG. 3) is inserted to represent the location of the toplift 25. Also the set of points 41 on the vertical line 42 are placed at the same incremental spaced distance P vertically that was found in the 3D point distribution for FIG. 14A. From FIG. 11B, incremental points are derived for the temporary curves 36 and 37, and those points 41 are inserted in FIG. 15 along curve 36 and along curve 37. Proceeding from FIGS. 14A and 14B to the construction drawings of FIG. 15 and FIG. 16 the point spacing P between first point 41 and the next higher point 41 is used as the radius of a circle in FIG. 16 to erect two such circles 36A and 37A at the 2D points on the horizontal line 30 at the bottom of the vertical line 42. Those circles pass through the next higher point 41 on curves 36 and 37 respectively. Concurrently, a larger circle 43 is constructed on the vertical line 42 with the second point 41 above the horizontal line 30 being used as the center of the circle 43. The radius of the circle 43 is the distance from that second point 41 on line 42 and the horizontal spacing S of line 42 and the curves 36 and 37. Where the larger circle 43 intersects with the smaller circles 36A and 37A in the positive direction of the Y axis will then determine the actual 2D location of the points on curves 36 and 37. That construction of cooperating circles 43 and 36A and 37A, as seen in FIG. 16, is the start of the creation of the actual points in space which create the curves 36 and 37.

Figures 17, 18:
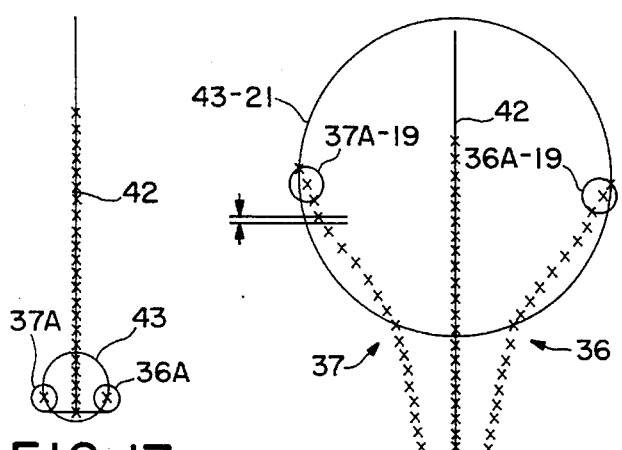
Figure 19:
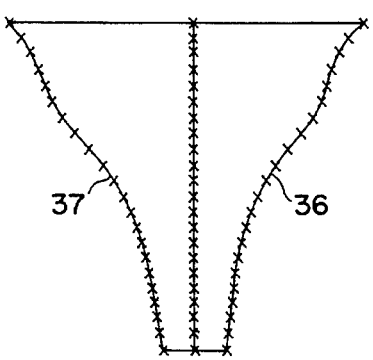
FIG. 19 is the 2D breast curve flattened construction.

FIG. 17 illustrates the method of creating a second point on curves 36 and 37 as the circle 43 increases in size relative to the smaller circles 36A and 37A. With that understanding of how points are found along curves 36 and 37, it can be appreciated how the upper portions of curves 36A and 37A are constructed relative to the spaces along the vertical line 42. Thus, for example, a twenty-first point on line 42 is the center of the largest circle 43-21 in FIG. 18. Where the circumference of circle 43-21 is intersected by the smaller circles 36A-19 and 37A-10 is the location for the top point on curves 36 and 37 respectively. When the points on the curves 36 and 37 are joined by continuous lines, the result is the curvature for the margins of the shape in 2D of the heel breast 38 surface seen in FIG. 19.

Figure 20:
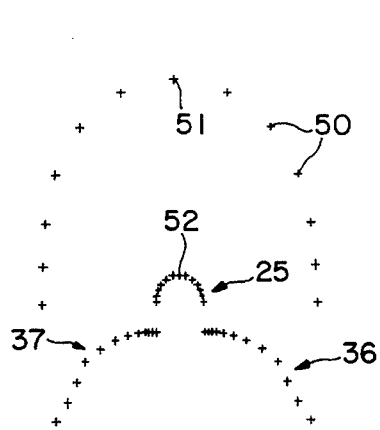
FIG. 20 illustrates the pattern of construction points on the perimeter of the heel seat, the heel toplift and the breast margins.
Figure 21:
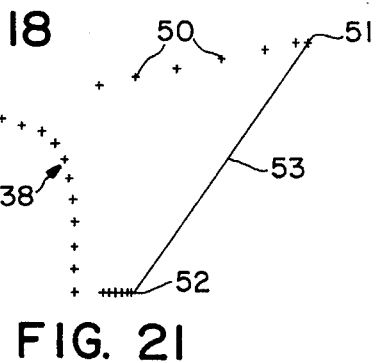
FIG. 21 illustrates the pattern of construction points on the side view of the heel seen in FIG. 3.
Figures 22, 23:
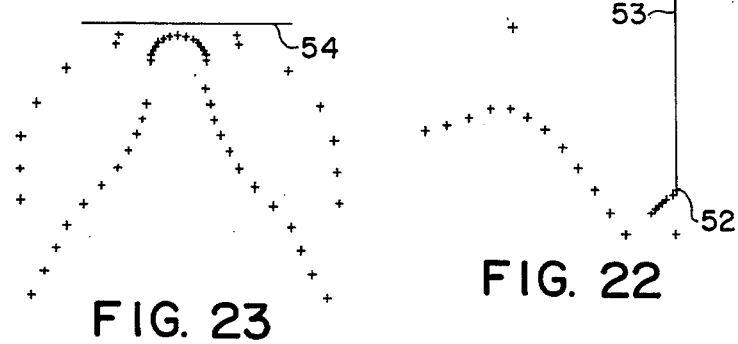
FIG. 22 is an illustration of the construction points on the heel side view rotated counterclockwise about the toplift center point to bring the alignment of the rearmost point in the heel seat into a vertical alignment over the heel center point.
FIG. 23 is a view of the pattern of construction points seen in FIG. 20 but now rotated into the vertical position.
Figure 24:
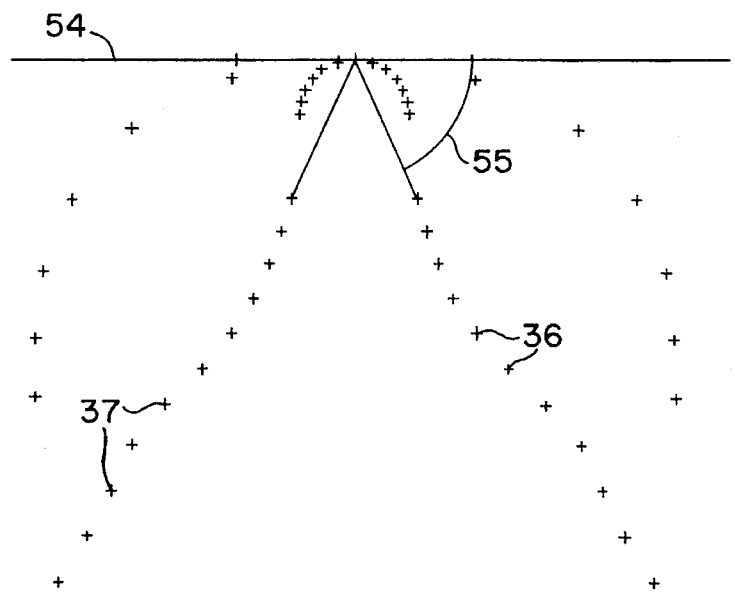
FIG. 24 is a top view of the construction method to begin flattening of the back of the 3D heel points.

Referring to drawing views of FIGS. 20 and 21, it is seen that the outer edge 33 of the heel seat 29 (FIG. 11A) is depicted by a series of points 50 in which the highest point 51 represents the rearmost edge of the seat heel seat curve 33. Also the rearmost point 52 on the toplift 25 is depicted, and the curved edges 36 and 37 of the heel breast 38 are outlined by a series of points seen in FIGS. 20 and 21. The first move, in order to begin developing a flat pattern for the back surface of the heel, is to rotate in space the side view of FIG. 21 so a line 53 between points 51 and 52 is in vertical alignment, as in FIG. 22. This rotation will move all of the points into a position that will allow the points to be projected onto a vertical plane represented by the line 54 of FIG. 24.

Figure 25:
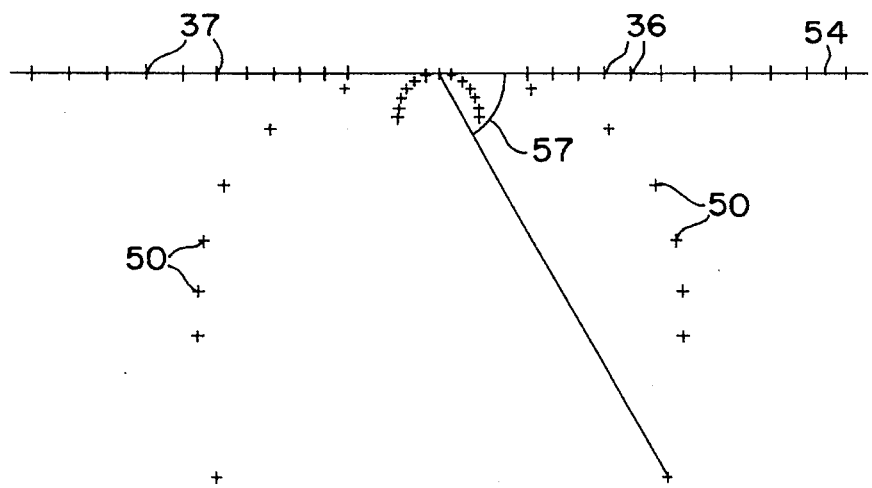
FIG. 25 is a top view of a further construction method for flattening of the 3D heel points.
Figure 26:
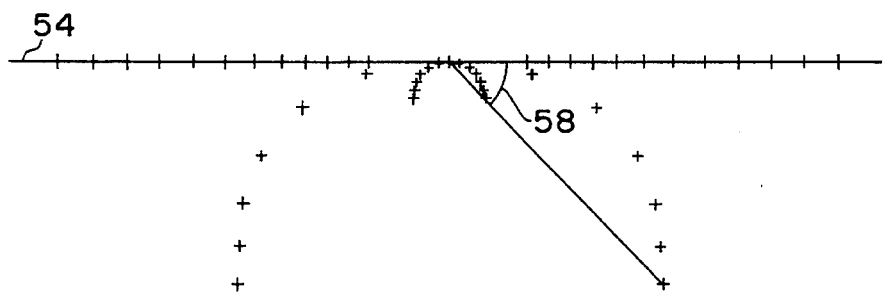
FIG. 26 is a top view of the concurrent flattening of the 3D points of the toplift and the heel seat.
Figure 27:
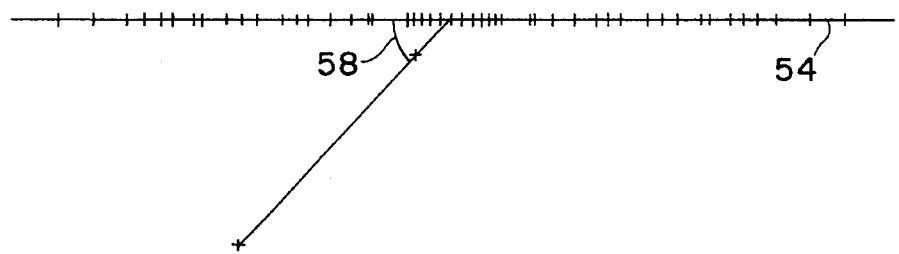
FIG. 27 is a top view of a further flattening of the heel toplift and heel seat.

Through a series of measured angles 55 all of the points for the breast curves 36 and 37 can be projected onto the plane represented by the line 54 as is indicated in FIG. 25 for the points on curve 36. Projecting the points in heel breast curves 36 and 37 has been completed in FIG. 25. In a like manner, the points 50 representing the edge of the heel seat are projected angularly, as in FIG. 26 and 27 at angles 57 and 58. The points representing the toplift at 52 and along the curved margin 25 (FIG. 1) are located by angle 58, as in FIG. 27, and projected onto the plane represented by line 54.

Figure 28:
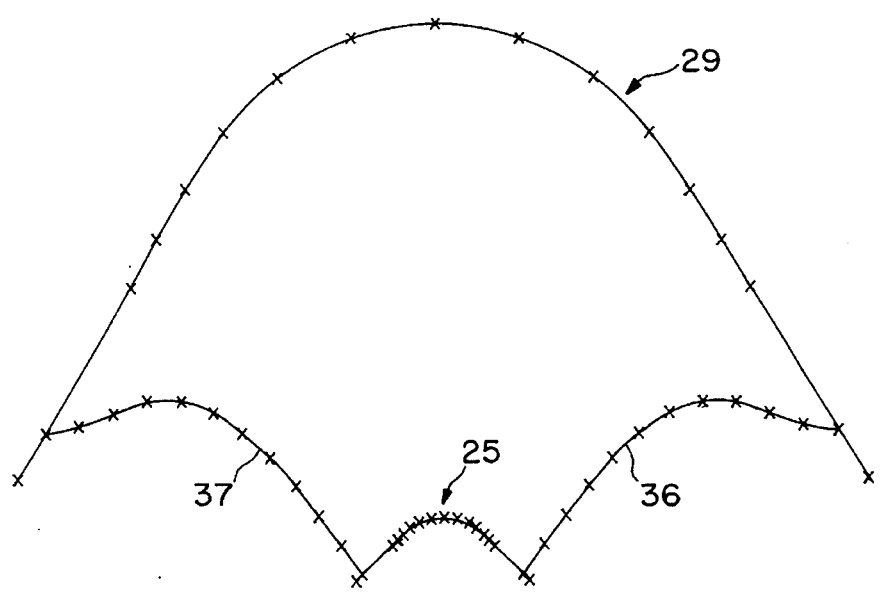
FIG. 28 is a front elevation view of the flattened heel cover pattern.
Figure 29:
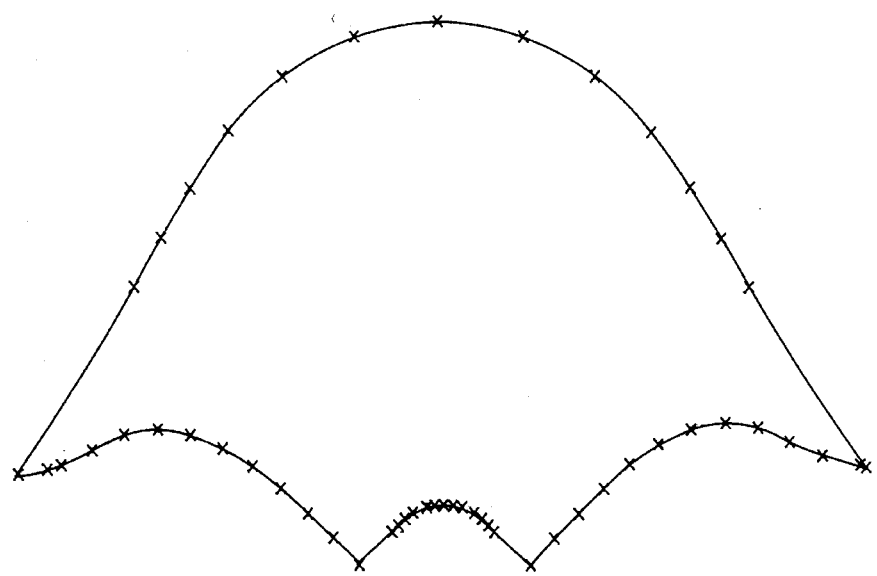
FIG. 29 is a heel cover pattern corrected as to the dimensions for a selected heel.

After all the points which depict the margins for the heel seat 29, the heel breast curves 36 and 37, and the toplift 25 are projected onto the vertical plane represented by line 54, that vertical plane can be rotated into a horizontal position so it appears as seen in FIG. 28 to reproduce in flat pattern the heel seat 29 shape, the heel breast side curves 36 and 37, and the toplift curve 25. Once that flat pattern is created, it is necessary to obtain actual length (or girth) measurements for those curves and enlarge the pattern outlines as in FIG. 29 so the size of the flat pattern substantially matches the actual dimensions of a selected heel.

The foregoing description of the method is of course understood to be flexible in the practice of the steps of the method so as to be consistent with the desired result which is to provide patterns showing how to cut cover material for the breast 38 and back of heels, as well as to generate a tool cutting path for generating a 3D model of shoe heels which vary in certain designated measurement characteristics for the production of a family of heels varying in order to fit a family of shoe sizes.

What is claimed is:

1. A method for generating a computerized three dimensional model of a shoe heel having a pinch curve, a right-hand breast curve, a left hand breast curve, a seat surface, a breast surface, a back surface, and a toplift surface, comprising the steps of:

a) digitizing into a computer a heel toplift pattern;
   b) digitizing into a computer a heel back profile pattern;
   c) digitizing into a computer a heel breast profile pattern;
   d) entering into a computer a table of values consisting of a heel size, a wedge angle, a heel back height, a heel seat length, a top length, a top width, a shrink percentage, a heel pinch sealing factor, and a pinch percentage;
   e) picking a heel seat pattern from a stored look-up table of seat patterns;
   f) displaying in a computer said toplift pattern, heel back profile pattern, heel breast profile pattern, and heel seat pattern in pre-defined top, side, front, and isometric views;
   g) generating a pinch curve, said pinch curve being a copy of the toplift pattern, scaled by the pinch scaling factor, and placed on the back profile pattern at a point which is the pinch percentage multiplied by the computer calculated length of the back profile curve;
   h) computer generating a right-hand breast curve and a left-hand breast curve connecting the ends of the seat pattern, the pinch curve, and the toplift curve;
   i) computer generating a seat surface, a breast surface, a back surface, and a toplift surface, said surfaces being directed by said seat pattern, toplift pattern, right-hand breast curve, left-hand breast curve, and pinch curve; and
   j) computer generating toolpath information for machine cutting a model of a shoe heel.

2. The method set forth in claim 1 wherein said seat pattern, said toplift pattern, right-hand breast curve, and left-hand breast curve are converted to two dimensional patterns for producing a two dimensional heel breast cover.

3. The method set forth in claim 1 wherein the seat pattern, toplift pattern, right-hand breast curve, and left-hand breast curve are converted to a two dimensional pattern for producing a two dimensional heel back cover.

4. The method set forth in claim 1 wherein sizes of model shoe heels may be generated by entering into a computer new tables of said values while retaining the said toplift pattern, back profile pattern, and breast profile pattern first entered.

* * * * *